United States Patent
Awad

(10) Patent No.: US 10,609,733 B2
(45) Date of Patent: Mar. 31, 2020

(54) COMMUNICATION SYSTEM

(71) Applicant: NEC Corporation, Minato-ku, Tokyo (JP)

(72) Inventor: Yassin Aden Awad, Uxbridge (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/510,751

(22) PCT Filed: Sep. 16, 2015

(86) PCT No.: PCT/JP2015/004712
§ 371 (c)(1),
(2) Date: Mar. 13, 2017

(87) PCT Pub. No.: WO2016/047106
PCT Pub. Date: Mar. 31, 2016

(65) Prior Publication Data
US 2017/0280484 A1 Sep. 28, 2017

(30) Foreign Application Priority Data

Sep. 26, 2014 (GB) .................... 1417068.2

(51) Int. Cl.
H04W 4/00 (2018.01)
H04W 74/08 (2009.01)
(Continued)

(52) U.S. Cl.
CPC ....... *H04W 74/0833* (2013.01); *H04L 1/1896* (2013.01); *H04W 52/143* (2013.01);
(Continued)

(58) Field of Classification Search
CPC ........... H04W 74/0833; H04W 88/187; H04W 52/143; H04W 74/006; H04W 74/008; H04L 1/1896
See application file for complete search history.

(56) References Cited

U.S. PATENT DOCUMENTS

2010/0034141 A1 2/2010 Meylan
2013/0083749 A1 4/2013 Xu et al.
(Continued)

FOREIGN PATENT DOCUMENTS

CN 103748942 A 4/2014
CN 103813467 A 5/2014
(Continued)

OTHER PUBLICATIONS

3rd Generation Partnership Project;Technical Specification Group Radio Access Network;Evolved Universal Terrestrial Radio Access (E-UTRA);Physical channels and modulation (Release 12), 3GPP TS 36.211 V12.2.0 (Jun. 2014).
(Continued)

Primary Examiner — Phuc H Tran

(57) ABSTRACT

A communication system is disclosed in which a communications node allocates resources for potential use by any of a plurality of user communication devices, including first type (e.g. legacy) user communication devices and second type (e.g. machine-type) communication devices. Control data is sent, to the user communication devices, defining communication resources for potential use by any of the user communication devices. The control data includes information identifying a first PRACH resource configuration for a first type user communication device and a second PRACH resource configuration for a second type of device such that the user devices can be distinguished by the PRACH configuration used.

14 Claims, 6 Drawing Sheets

(51) Int. Cl.
*H04W 74/00* (2009.01)
*H04L 1/18* (2006.01)
*H04W 52/14* (2009.01)
*H04W 88/18* (2009.01)

(52) U.S. Cl.
CPC ....... *H04W 74/006* (2013.01); *H04W 74/008* (2013.01); *H04W 88/187* (2013.01)

(56) References Cited

U.S. PATENT DOCUMENTS

| | | |
|---|---|---|
| 2013/0301524 A1 | 11/2013 | Xu et al. |
| 2014/0098761 A1 | 4/2014 | Lee et al. |
| 2014/0112259 A1* | 4/2014 | Bagheri .............. H04W 74/006 370/329 |
| 2015/0156760 A1 | 6/2015 | Yu et al. |
| 2015/0326995 A1* | 11/2015 | Li .................. H04W 74/08 370/329 |
| 2016/0381712 A1* | 12/2016 | Yang ................ H04W 4/005 370/329 |

FOREIGN PATENT DOCUMENTS

| | | |
|---|---|---|
| CN | 103959878 | 7/2014 |
| RU | 2455791 C1 | 7/2012 |
| WO | 2010/017225 A1 | 2/2010 |
| WO | 2013/049520 A1 | 4/2013 |
| WO | 2013/132327 A1 | 9/2013 |
| WO | 2013/169154 A1 | 11/2013 |
| WO | 2014/055878 A1 | 4/2014 |

OTHER PUBLICATIONS

3rd Generation Partnership Project;Technical Specification Group Services and System Aspects;Service requirements for Machine-Type Communications (MTC);Stage 1 (Release 12), 3GPP TS 22.368 V12.4.0 (Jun. 2014).
Mediatek Inc: "On Required System Functionalities for MTC UEs Operating in Enhanced Coverage Mode", 3GPP Draft; R1-130218, 3GPP Mobile Competence Centre ; 3GPP TGS RAN WG1 Meeting #72, 650, Route Des Lucioles, St Julian's, Malta, Jan. 28-Feb. 1, 2013.
International Search Report for PCT Application No. PCT/JP2015/004712, dated Dec. 17, 2015.
Written Opinion of the International Search Authority for PCT Application No. PCT/JP2015/004712.
Russian Office Action for RU Application No. 2017114357/07(025035) dated Jan. 31, 2018 with English Translation.
3rd Generation Partnership Project, "Search space for enhanced control channels", Ericsson, ST-Ericsson, Nov. 14-18, 2011, 3GPP TSG-RAN WG1 #67, R1-113680, San Francisco, USA.
3rd Generation Partnership Project, "RACH Channel Design for MTC Coverage Enhancements", Qualcomm Incorporated, Feb. 10-14, 2014, 3GPP TSG-RAN WG1 #76, R1-140447, Prague, Czech Republic.
Japanese Office Action for JP Application No. 2017-516178 dated Jan. 17, 2018 with English Translation.
Office Action dated Apr. 24, 2019 in Japanese Patent Application No. 2018-140834.
Sharp, "On PRACH coverage enhancement for MTC UE", 3GPP TSG RAN WG1 Meeting#76, R1-140640, Prague, Czech Republic, Feb. 10-14, 2014, 5 pages.
3GPP TSG RAN WG1 Meeting #76, NTT DOCOMO, "Discussion on Multi-level PRACH Coverage Enhancement", R1-140616, Feb. 10-14, 2014, Prague, Czech Republic.
3GPP TSG WG1 Meeting #74bis, Huawei, HiSilicon, "Discussion on PRACH coverage improvement and mechanism for determining the amount of needed coverage improvement", R1-134054, Oct. 7-11, 2013 Guangzhou, China.
Chinese Office Action for CN Application No. 201580052225.4 dated Dec. 20, 2019 with English Translation.

* cited by examiner

COMMUNICATION SYSTEM

This is a National Stage of International Application No. PCT/JP2015/004712 filed Sep. 16, 2015, claiming priority based on United Kingdom Patent Application No. 1417068.2 filed Sep. 26, 2014, the contents of all of which are incorporated herein by reference in their entirety.

TECHNICAL FIELD

The present invention relates to mobile communications devices and networks, particularly but not exclusively those operating according to the $3^{rd}$ Generation Partnership Project (3GPP) standards or equivalents or derivatives thereof. The invention has particular although not exclusive relevance to the Long Term Evolution (LTE) of UTRAN (called Evolved Universal Terrestrial Radio Access Network (E-UTRAN)), including LTE-Advanced.

BACKGROUND ART

In a mobile (cellular) communications network, (user) communication devices (also known as user equipment (UE), for example mobile telephones) communicate with remote servers or with other communication devices via base stations. In their communication with each other, communication devices and base stations use licensed radio frequencies, which are typically divided into frequency bands and/or time blocks.

In order to be able to communicate via the base stations, communication devices need to monitor control channels operated by the base stations. One of these control channels, the so-called physical downlink control channel (PDCCH) carries the scheduling assignments and other control information. The PDCCH serves a variety of purposes. Primarily, it is used to convey the scheduling decisions to individual communication devices, i.e. scheduling assignments for uplink and downlink communication.

The information carried on the PDCCH is referred to as downlink control information (DCI). Physical control channels, such as the PDCCH, are transmitted on an aggregation of one or several consecutive control channel elements (CCEs), where a control channel element corresponds to nine resource element groups (REGs). Each REG has four resource elements (REs).

Another control channel, the so-called physical random access channel (PRACH) is provided for synchronising transmissions between a communication device and the network (e.g. when setting up an initial access for the communication device and/or whenever re-synchronisation is necessary). In the current standard specification (from Rel-8), the resource (preamble, time, frequency) allocated to the PRACH is configured in advance and the applicable PRACH parameters are broadcast by the network as part of system information in the so-called System Information Block 2 (SIB2). One of the parameters specifies the so-called random access preamble, which consists of a cyclic prefix part and a sequence part. The length of the preamble (i.e. the overall length of the two parts combined) depends on the frame structure and the random access configuration. The preamble format is controlled by higher layers (via the SIB2). Thus, based on the parameters included in the SIB2, communication devices are able to initiate access with the network over the correct PRACH resource and using the appropriate parameters (e.g. transmit an appropriate preamble). Further details of the physical layer random access preamble can be found in section 5.7.1 of 3GPP Technical Specification (TS) 36.211, the contents of which are incorporated herein by reference.

When an idle mode communication device needs to communicate with other communication nodes, it needs to change its operation mode to the so-called radio resource control (RRC) connected mode (from RRC idle mode). In order to do so, the communication device performs a random access procedure with a suitable base station (e.g. a base station having the strongest signal and/or a base station that the communication device is authorised to use). The random access procedure includes the communication device selecting and transmitting to the base station (over the PRACH advertised via the SIB2) an appropriate preamble sequence along with a temporary identifier for identifying the communication device for the base station. If the base station does not receive the communication device's transmission successfully (e.g. because a plurality of devices are transmitting preambles at the same time resulting in a collision) and/or does not send an appropriate random access response, then the communication device is configured to send another preamble sequence after a predetermined delay (and possibly repeat this step until the base station responds). If the communication device's transmission is received successfully (e.g. its transmission does not collide with transmissions by others), then the base station sends an appropriate random access response (in which the base station identifies the communication device using the received temporary identifier) and allocates resources for the communication device for communicating with the network.

Thus, once the base station responds to a preamble transmission by the communication device, the communication device is able to request in its next message the establishment of an RRC connection (and/or the like) using the allocated resources. Once an RRC connection is established between the communication device and the base station, the communication device is able to communicate with other communication nodes via that base station (and via the core network) using the resources allocated by the base station.

Recent developments in telecommunications have seen a large increase in the use of machine-type communications (MTC) devices which are networked devices arranged to communicate and perform actions without human assistance. Examples of such devices include smart meters, which can be configured to perform measurements and relay these measurements to other devices via a telecommunication network. Machine-type communication devices are also known as machine-to-machine (M2M) communication devices.

MTC devices connect to the network (after performing an appropriate random access procedure, if necessary) whenever they have data to send to or receive from a remote 'machine' (e.g. a server) or user. MTC devices use communication protocols and standards that are optimised for mobile telephones or similar user equipment. However, MTC devices, once deployed, typically operate without requiring human supervision or interaction, and follow software instructions stored in an internal memory. MTC devices might also remain stationary and/or inactive for a long period of time. The specific network requirements to support MTC devices have been dealt with in the 3GPP TS 22.368 standard, the contents of which are incorporated herein by reference.

For the Release 13 (Rel-13) version of the standards relating to MTC devices, support for a reduced bandwidth of 1.4 MHz in downlink and uplink is envisaged. Thus, some MTC devices will support only a limited bandwidth (typically 1.4 MHz) compared to the total LTE bandwidth and/or they may have fewer/simplified components. This allows such 'reduced bandwidth' MTC devices to be made more economically compared to MTC devices supporting a larger bandwidth and/or having more complicated components.

The lack of network coverage (e.g. when deployed indoors), in combination with the often limited functionality of MTC devices, can result in such MTC devices having a low data rate and therefore there is a risk of some messages or channels, such as the PDCCH, not being received by an MTC device. In order to mitigate this risk, it has been proposed to increase the coverage of the PDCCH (and/or the evolved physical downlink control channel (EPDCCH) in Rel-13) to support such MTC devices (e.g. corresponding to 20 dB for frequency division duplex (FDD) transmissions).

One approach proposed for the enhancement of coverage, for so called 'coverage enhanced MTC devices', is the repetition of the same EPDCCH information (e.g. DCI) across multiple (e.g. two, three, four) subframes. In other words, for coverage enhanced MTC devices, the base station duplicates the EPDCCH information in the time domain (the base station re-transmits the same EPDCCH information in one or more subframes subsequent to the subframe in which that EPDCCH information is first sent). Such a coverage enhanced MTC device can be configured to combine the multiple copies of the (same) EPDCCH information received in the multiple subframes, and after combining the received information, the coverage enhanced MTC device is more likely to be able to decode the EPDCCH successfully than based on a single copy of the EPDCCH information.

In practice, MTC devices may be deployed in different locations and they may experience different channel conditions. Therefore, the number of repetitions (of the EPDCCH information) may need to be tailored for each device's situation or coverage level. Therefore, in order to facilitate such enhanced coverage, each MTC device will need to inform its serving base station of the amount of coverage required (e.g. 5 dB/10 dB/15 dB/20 dB coverage enhancement) to allow the base station to adjust its control signalling appropriately.

Ideally, however, physical layer control signalling (e.g. EPDCCH signalling) and higher layer common control information (e.g. SIB, random access response (RAR), paging messages, and/or the like) exhibit a high level of commonality between solutions for reduced bandwidth communication devices and solutions for coverage enhanced communication devices.

However, the inventors have realised that in order to support reduced bandwidth MTC devices in release 13, the provision of PRACH for the reduced bandwidth MTC devices needs to address a number of issues including, for example:

due to the reduced bandwidth of 1.4 MHz in downlink and uplink, the reduced bandwidth MTC devices cannot receive a PDCCH which is densely spread across an entire cell bandwidth (i.e. it may be transmitted over frequencies falling outside the 1.4 MHz supported by the MTC device);

consequently, reduced bandwidth MTC devices also cannot receive the scheduling assignment included in legacy RAR messages transmitted in the PDCCH (when it is spread across the entire cell bandwidth); and the EPDCCH Common Search Space (CSS) can be defined in such a way that the physical broadcast channel (PBCH) indicates its location in time-frequency resources; in which case a reduced bandwidth MTC device will be unable to receive the CSS if either the PBCH or the EPDCCH is transmitted outside the 1.4 MHz band supported by the MTC device.

It appears that there is no need to change the current PRACH design in order to support reduced bandwidth MTC devices in Rel-13, except that DCI for RAR messages will need to be transmitted in the EPDCCH Common Search Space (CSS), rather than in the PDCCH CSS, for MTC devices (since a Rel-13 MTC device will only monitor the EPDCCH CSS for potential dynamic scheduling of the common control information). However, it is yet to be resolved how a base station can efficiently and reliably identify a reduced bandwidth MTC device in Rel-13 so that the corresponding DCI (e.g. a RAR message) is transmitted in the EPDCCH CSS (for the bandwidth reduced MTC device).

In addition to the issues associated with reduced bandwidth MTC devices, the provision of PRACH for coverage enhanced MTC devices in Rel-13 will need to support the repetition of the PRACH, across multiple subframes in time domain, by using the existing LTE Rel-8 preamble formats in order to enhance the coverage of the PRACH channel and for backward compatibility.

Therefore, the provision of PRACH for coverage enhanced MTC UEs in Rel-13 also needs to address at least the following issues:

how to identify reduced bandwidth communication devices and coverage enhanced MTC communication devices in Rel-13 (so that a DCI/RAR can be transmitted in the EPDCCH CSS for such communication devices);

how to reduce the collision probability (contention problem) between reduced bandwidth communication devices and coverage enhanced (CE) communication devices, and also between different CE levels; and because there is a lot of overhead associated with CE levels (due to time domain repetitions), it is desirable to avoid PRACH preamble collision with other coverage levels as well as reduced bandwidth communication devices (although collision/contention with the same CE level should be allowed).

SUMMARY OF INVENTION

The present invention seeks to provide systems, devices and methods which at least partially address the above issues.

According to one aspect the invention provides a communications node operable to allocate resources for potential use by any of a plurality of user communication devices, including first type (e.g. legacy) user communication devices and second type (e.g. machine-type) communication devices, for communicating with the communications node, the communications node comprising: means for sending, to said plurality of user communication devices, control data defining communication resources for potential use by any of said plurality of user communication devices, the control data including information identifying at least; i) a first physical random access channel, PRACH, resource configuration for said first type user communication devices; and ii) a second PRACH resource configuration for said second type devices; means for receiving, from a user communication device of said plurality of user communication devices, a random access message conforming to one of said first and second PRACH resource configurations over communication resources defined by said control data; and means for determining, based on the PRACH resource configuration with which said received random access message conforms, whether said user communication device comprises a first type user communication device or comprises a second type device.

The means for sending may be operable to send a random access response (RAR) mapped to a physical downlink control channel (PDCCH) when said user communication device is determined to comprise a first type user communication device and to send a random access response (RAR) mapped to an enhanced physical downlink control channel (EPDCCH) when said user communication device is determined to comprise an MTC device.

Each said PRACH resource configuration may define an associated preamble sequence and wherein said random access message may include a prefix and a preamble sequence conforming to one of said first and second PRACH resource configurations, and wherein said determining means may be operable to determine whether said first user communication device comprises a first type user communication device or comprises a second type device based on said preamble sequence included in said random access message.

The first PRACH resource configuration may defines a first set of communication resources for potential use by said first type user communication devices. The second PRACH resource configuration may define a second set of communication resources, different to said first set, for potential use by said second type devices. The determining means may be operable to determine that: i) the first user communication device comprises a first type user communication device when said receiving means receives said random access message over a communication resource that belongs to said first set of communication resources. The determining means may be operable to determine that: ii) the first user communication device comprises a second type device when said receiving means receives said random access message over a communication resource that belongs to said second set of communication resources.

The determining means may be operable to determine, when said user communication device is a second type device, whether that second type device comprises a reduced bandwidth second type device and/or a coverage enhanced second type device.

The determining means may be operable to determine, when said user communication device is a coverage enhanced second type device, a level of coverage enhancement required by said coverage enhanced second type device.

At least one of said first and said second PRACH resource configurations may define a set of communication resources comprising no more than six physical resource blocks.

The communications node may comprise a base station.

The communications node may comprise a base station operating in accordance with the long term evolution, LTE, set of standards.

The communication resources may be resources provided in accordance with at least one of a time, a frequency, and code sequence multiplexing scheme.

According to one aspect the invention provides a machine-type communication, (MTC), device for a communication system in which a communications node allocates resources for potential use by any of a plurality of user communication devices, including first type (e.g. legacy) user communication devices and MTC communication devices, the second type communications device comprising: means for receiving, from the communications node, control data defining communication resources for potential use by any of said plurality of user communication devices, the control data including information identifying at least; i) a first physical random access channel, PRACH, resource configuration for said first type user communication devices; and ii) a second PRACH resource configuration for said MTC devices; and means for sending, to the communications node, a random access message conforming to said second PRACH resource configuration over communication resources defined by said control data.

The means for receiving may be operable to receive a random access response (RAR) mapped to an enhanced physical downlink control channel (EPDCCH) responsive to said random access message.

According to one aspect the invention provides a method performed by a communications node in a communication system in which the communications allocates resources for potential use by any of a plurality of user communication devices, including first type user communication devices and second type (e.g. machine-type) communication devices, for communicating with the communications node, the method comprising: sending, to said plurality of user communication devices, control data defining communication resources for potential use by any of said plurality of user communication devices, the control data including information identifying at least; i) a first physical random access channel, PRACH, resource configuration for said first type user communication devices; and ii) a second PRACH resource configuration for said second type devices; receiving, from a user communication device of said plurality of user communication devices, a random access message conforming to one of said first and second PRACH resource configurations over communication resources defined by said control data; and determining, based on the PRACH resource configuration with which said received random access message conforms, whether said user communication device comprises a first type user communication device or comprises a second type device.

The method may further comprise: sending a random access response (RAR) mapped to a physical downlink control channel (PDCCH) when said user communication device is determined to comprise a first type user communication device; and sending a random access response (RAR) mapped to an enhanced physical downlink control channel (EPDCCH) when said user communication device is determined to comprise a second type device.

According to one aspect the invention provides a method performed by a machine-type communication, 'MTC', device in a communication system in which a communications node allocates resources for potential use by any of a plurality of user communication devices, including first type user communication devices and MTC devices, the method comprising: receiving, from the communications node, control data defining communication resources for potential use by any of said plurality of user communication devices, the control data including information identifying at least; i) a first physical random access channel, PRACH, resource configuration for said first type user communication devices; and ii) a second PRACH resource configuration for said MTC devices; and sending, to the communications node, a random access message conforming to said second PRACH resource configuration over communication resources defined by said control data.

The method may further comprise receiving a random access response (RAR) mapped to an enhanced physical downlink control channel (EPDCCH) responsive to said random access message.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Embodiments of the invention will now be described by way of example only with reference to the attached figures in which.

DESCRIPTION OF EMBODIMENTS

<Overview>

Figure 1:
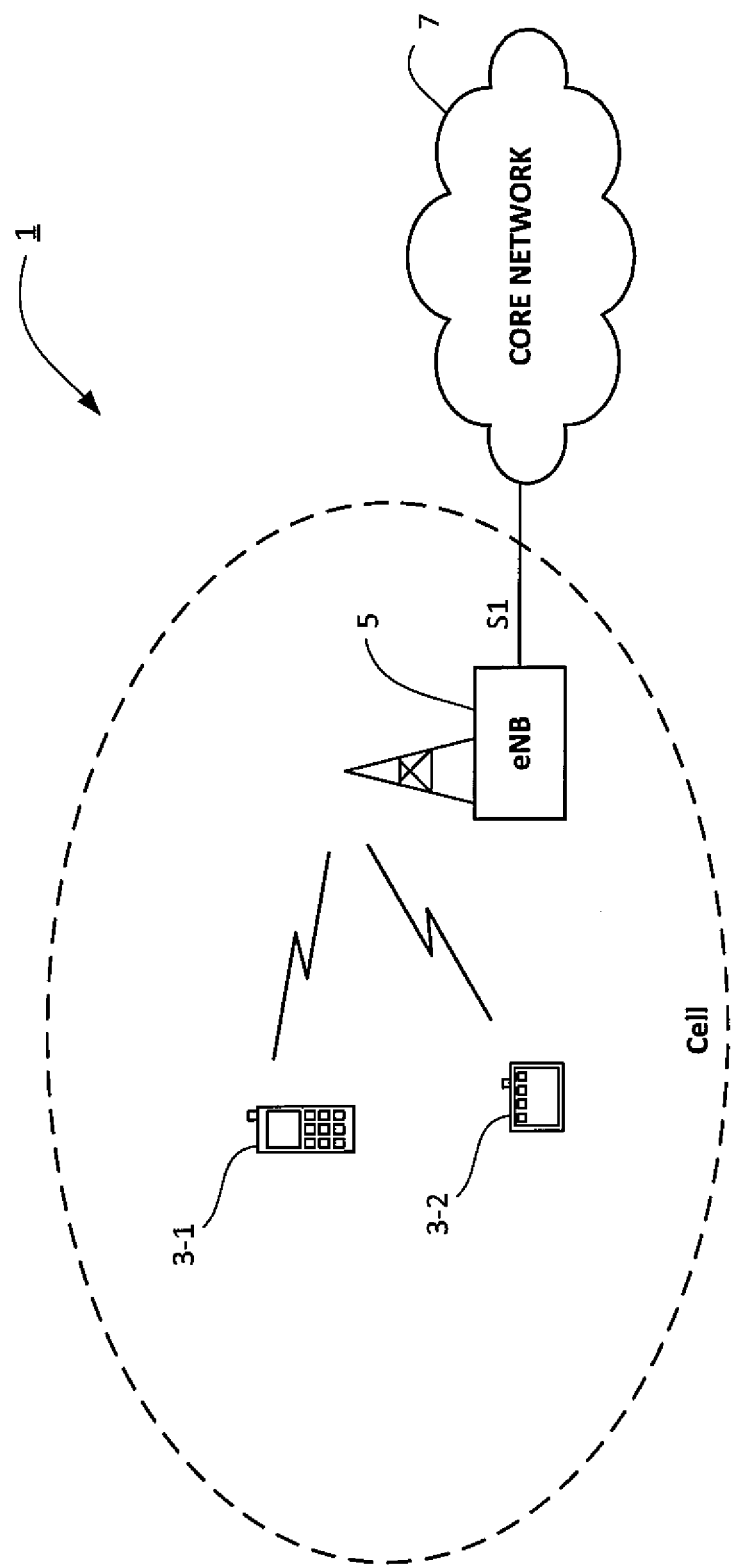
FIG. 1 schematically illustrates a telecommunication system to which embodiments of the invention may be applied.

FIG. 1 schematically illustrates a mobile (cellular) telecommunication system 1 in which communication devices 3 (such as mobile telephone 3-1 and MTC device 3-2) can communicate with each other and/or with other communication nodes via an E-UTRAN base station 5 (denoted 'eNB') and a core network 7. As those skilled in the art will appreciate, whilst one mobile telephone 3-1, one MTC device 3-2, and one base station 5 are shown in FIG. 1 for illustration purposes, the system, when implemented, will typically include other base stations and communication devices.

The base station 5 is connected to the core network 7 via an S1 interface. The core network 7 includes, amongst others: a gateway for connecting to other networks, such as the Internet and/or to servers hosted outside the core network 7; a mobility management entity (MME) for keeping track of the locations of the communication devices 3 (e.g. the mobile telephone and the MTC device) within the communication network 1; and a home subscriber server (HSS) for storing subscription related information (e.g. information identifying which communication device 3 is configured as a machine-type communication device) and for storing control parameters specific for each communication device 3.

Each communication device 3 may fall into one or more of categories of UEs. A first category of UEs include communication devices that support only an earlier release of the LTE standard (e.g. Rel-8, Rel-9, Rel-10, Rel-11, and/or Rel-12). Such group of communication devices are commonly referred to as legacy UEs (assuming that the base station 5 is operating in accordance with Rel-13 of the LTE standards). It will be appreciated that some communication devices that belong to this group may not support the EPDCCH (only PDCCH). A second category of UEs include reduced bandwidth UEs (e.g. Rel-13 MTC devices capable of using a 1.4 Mhz bandwidth only), which are not able to communicate over the entire bandwidth available in the cell of the base station 5. A third category of UEs includes coverage enhanced UEs (e.g. some MTC devices), which require certain base station functionalities to be simplified and/or relaxed (although such coverage enhanced UEs may support other functionalities as normal).

The base station 5 is configured to transmit a physical downlink control channel (PDCCH) and an evolved PDCCH (EPDCCH) for reception by the communication devices 3 located within the base station's 5 cell. The (E)PDCCH allocates uplink and downlink resources to the communication devices 3. One difference between the PDCCH and the EPDCCH is that the common search space of the EPDCCH uses a relatively narrow frequency spectrum (1.4 Mhz) that makes it compatible with Rel-13 reduced bandwidth MTC devices, whilst PDCCH uses a wider frequency spectrum in order to provide backward compatibility with legacy (pre-Rel-13) communication devices.

The so-called common search space (CSS) carries downlink control information (DCI) in the cell which is common to all communication devices 3. For example, the CSS may include: system information blocks (SIB s) which contain information related to cell access parameters; random access channel (RACH) messages (e.g. a Random Access Response (RAR) and/or Contention Resolution); and/or the paging channel (PCH). In LTE Rel-13, the CSS forms part of the EPDCCH. The (time-frequency) resources allocated for the CSS are indicated via the so-called physical broadcast channel (PBCH).

The base station 5 is configured to transmit a 'SIB2' in its cell for reception by the communication devices 3. The SIB2 includes the appropriate parameters for the PRACH resource configuration currently in use in the cell of the base station 5. A typical PRACH resource configuration for a cell and the associated parameters and values are illustrated in Table 1.

TABLE 1

| PRACH resource configuration in SIB2 | | |
|---|---|---|
| PRACH configuration | Parameter | Value |
| Root index | rootSequenceIndex | (0-837) |
| Preambles | numberOfRA-Preambles | 4, 8, 12, 16, 20, 24, 28, 32, 36, 40, 44, 48, 52, 56, 60, 64 |
| Frequency | prach-FreqOffset | (0-94) |
| Time | prach-ConfigIndex | (0-63) |

As explained above, the communication devices 3 need to establish an RRC connection with the base station 5 in order to be able to communicate with other devices via that base station 5 (and the core network 7). Therefore, each communication device 3 is configured to perform an appropriate random access procedure (via the PRACH) in order to synchronise their transmissions with the base station 5 and to indicate to the network the reason for establishing the RRC connection.

However, as also explained above, some communication devices may support only an earlier release of the LTE standard (legacy UEs) than the release supported by the base station 5, some communication devices may comprise reduced bandwidth UEs, and some communication devices may comprise coverage enhanced UEs.

Beneficially, the PRACH is configured in the cell of the base station 5 in such a way that different categories of communication devices are allocated different PRACH resources and/or different PRACH preambles for use upon initiation of a random access procedure with the base station 5. In this example, the different categories of communication devices comprise: i) legacy UEs (MTC devices); ii) reduced bandwidth UEs (MTC devices); and iii) coverage enhanced UEs (MTC devices). Accordingly, the PRACH configuration by the base station 5 comprises separate PRACH configuration parameters for each category of UEs (specifying the respective associated PRACH resources and/or associated PRACH preambles per UE category).

Therefore, upon receipt of a random access preamble sequence, the base station 5 is advantageously able to determine (by checking the PRACH resources and/or PRACH preambles used) the category of the communication device 3 that sent the preamble sequence. Specifically, the base station 5 is able to discern at least legacy UEs (MTC devices), reduced bandwidth UEs (MTC devices), and coverage enhanced UEs (MTC devices) from each other.

In the example shown in FIG. 1, the mobile telephone 3-1 comprises a legacy UE and the MTC device 3-2 comprises a reduced bandwidth MTC device. By listening to the SIB2 information (broadcast by the base station 5), both the mobile telephone 3-1 and the MTC device 3-2 are able to derive the applicable PRACH configuration for its category of UEs, and perform random access procedures accordingly. Thus, the mobile telephone 3-1 selects one of the appropriate PRACH preambles associated with legacy UEs and transmits the selected preamble to the base station 5 over the PRACH resource associated with legacy UEs. On the other hand, the MTC device 3-2 selects one of the appropriate PRACH preambles associated with reduced bandwidth UEs and transmits the selected preamble to the base station 5 over the PRACH resource associated with reduced bandwidth UEs.

Therefore, based on the received preamble and/or the used PRACH resource, the base station 5 is able to discern the mobile telephone 3-1 from the MTC device 3-2, and send a random access response (RAR) accordingly. Specifically, the base station 5 is configured to send a RAR including an appropriate DCI: i) in the PDCCH CSS (in response to a preamble sequence sent by a legacy UE); and in the EPDCCH CSS (in response to a preamble sequence sent by a reduced bandwidth UE and/or a coverage enhanced UE).

In summary, the base station is advantageously able to allocate PRACH resources according to the category of the communication device (by broadcasting appropriate PRACH configurations per category), and respond to preamble transmissions over communication resources (PDCCH/EPDCCH) that the UE category of the sending communication device is able to use.

<Communication Device>

Figure 2:
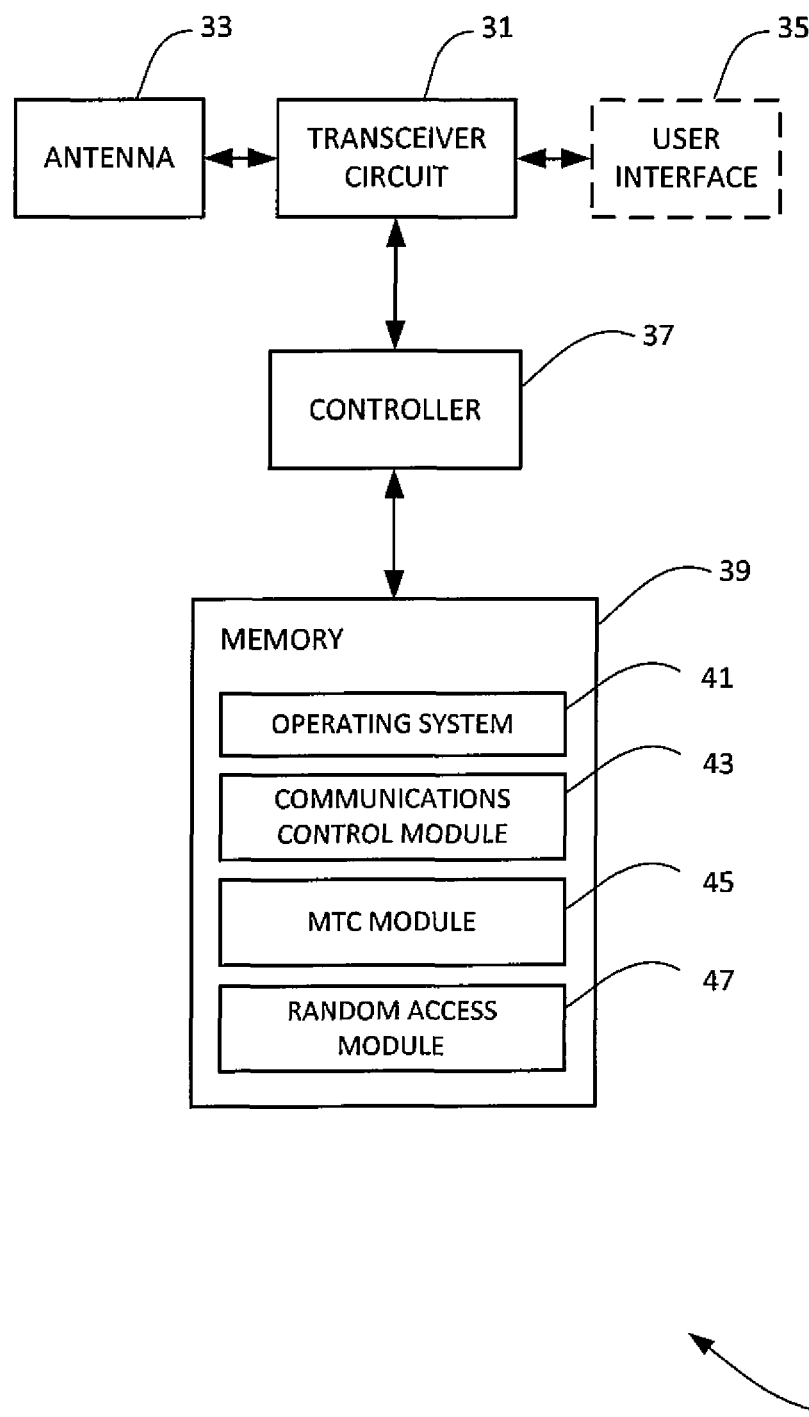
FIG. 2 is a block diagram illustrating the main components of the communication device shown in FIG. 1.

FIG. 2 is a block diagram illustrating the main components of the communication device 3 shown in FIG. 1. The communication device 3 may be an MTC device or a mobile (or 'cellular') telephone configured as a machine-type communication device. The communication device 3 comprises a transceiver circuit 31 which is operable to transmit signals to, and to receive signals from, the base station 5 via at least one antenna 33. Typically, the communication device 3 also includes a user interface 35 which allows a user to interact with the communication device 3, however this user interface 35 may be omitted for some MTC devices.

The operation of the transceiver circuit 31 is controlled by a controller 37 in accordance with software stored in memory 39. The software includes, among other things, an operating system 41, a communication control module 43, an MTC module 45, and a random access module 47.

The communication control module 43 controls communications between the communication device 3 and the base station 5 and/or other communication nodes (via the base station 5).

The MTC module 45 is operable to carry out machine-type communication tasks. For example, the MTC module 45 may collect data for sending (e.g. periodically and/or upon detecting a trigger) to a remote server (via the transceiver circuit 31).

The random access module 47 is responsible for obtaining and maintaining synchronisation of transmissions with the network. For example, the random access module 47 may send (via the transceiver circuit 31) a random access transmission (including a selected preamble sequence) to the base station 5 when the communication device 3 needs to establish an RRC connection with the network. When selecting/sending a random access preamble sequence, the random access module 47 takes into account the category of the communication device 3 and the PRACH configuration (broadcast by the base station 5) applicable for that category of communication devices.

<Base Station>

Figure 3:
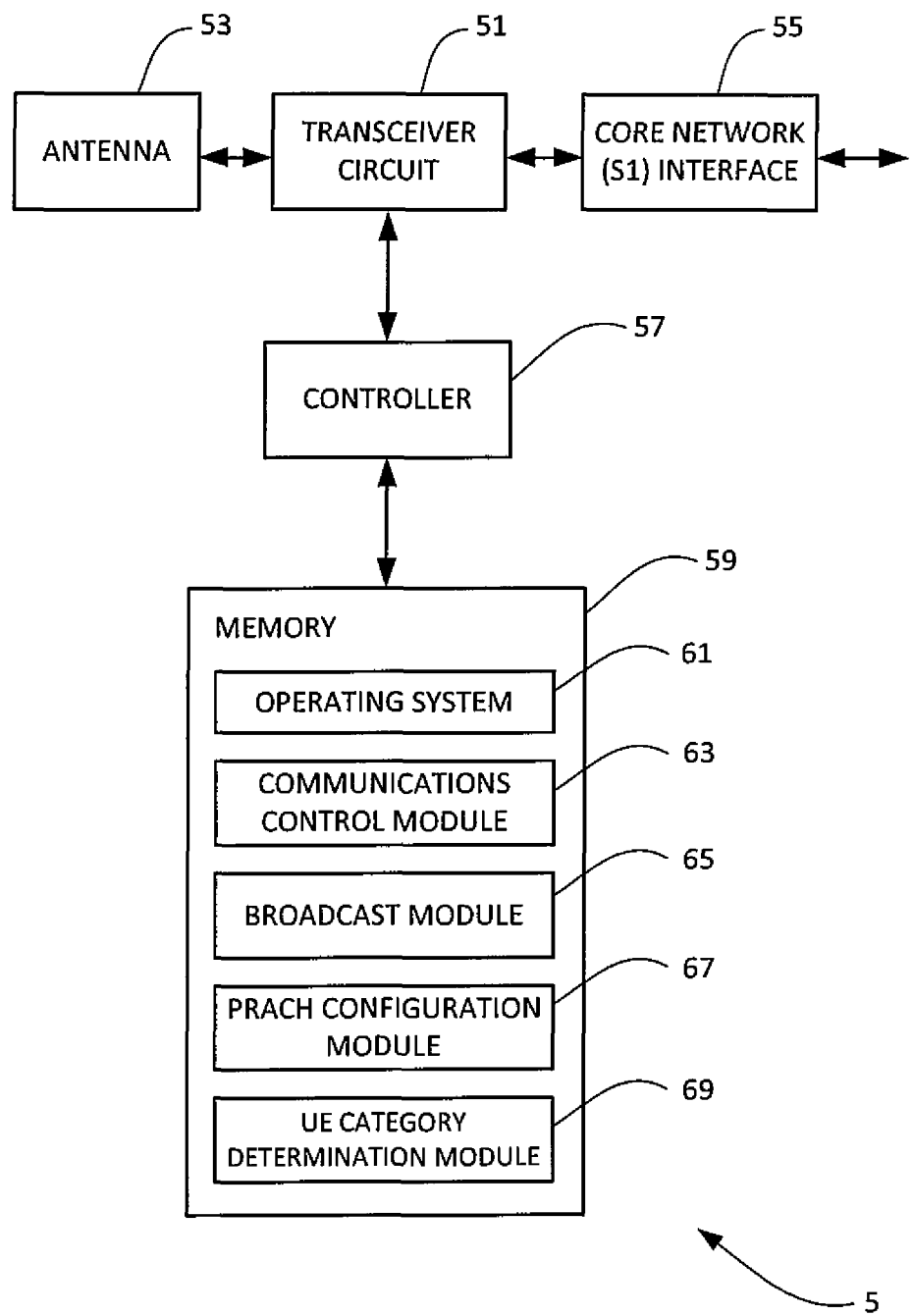
FIG. 3 is a block diagram illustrating the main components of the base station shown in FIG. 1.

FIG. 3 is a block diagram illustrating the main components of the base station 5 shown in FIG. 1. The base station 5 comprises an E-UTRAN base station (eNB) comprising a transceiver circuit 51 which is operable to transmit signals to, and to receive signals from, the communication devices 3 via one or more antennas 53. The base station 5 is also operable to transmit signals to and to receive signals from a core network 7 via an appropriate core network interface 55 (such as an S1 interface). The operation of the transceiver circuit 51 is controlled by a controller 57 in accordance with software stored in memory 59.

The software includes, among other things, an operating system 61, a communication control module 63, a broadcast module 65, a PRACH configuration module 67, and a UE category determination module 69.

The communication control module 53 controls communications with the communication devices 3. The communication control module 53 is also responsible for scheduling the resources to be used by the communication devices 3 served by this base station 5.

The broadcast module 65 transmits, via the broadcast channel, system information (such as configuration of the cell of the base station 5) for receipt by the communication devices 3 located within the cell of the base station 5. For example, the broadcast module 65 transmits the PRACH configuration employed in the cell.

The PRACH configuration module 67 is responsible for configuring associated random access parameters for use by each category of communication devices when communicating over the PRACH. The PRACH configuration module 67 is responsible for informing (via the broadcast module 65) the communication devices 3 located within the cell of the base station 5 about the random access (PRACH) configuration applicable for each category of communication devices.

The UE category determination module 69 determines, based on the received preamble sequence (e.g. the time/frequency resource the preamble sequence is sent on and/or the selected preamble) the category of the sending communication device 3.

In the above description, the communication device 3 and the base station 5 are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

A number of embodiments (options A to D) will be described below, with reference to FIGS. 4 to 6. It will be appreciated that these embodiments are not mutually exclusive and any of the options A to D may be combined within the same system, either within a single cell and/or in neighbouring cells. For example, the base station 5 may be configured to change from one operation mode to another, e.g. periodically, in dependence on the number of MTC devices 2 in its cell, in dependence on the overall load in the cell, in dependence on the number of preamble retransmissions (e.g. due to collision), and/or the like.

<Operation—Option A>

This embodiment is based on the concept of (PRACH) preamble sequence partitioning. In other words, different (sets of) preamble sequences are reserved for different categories of communication devices 3 (e.g. reduced bandwidth MTC devices, coverage enhanced MTC devices, mobile telephones conforming to different releases of the LTE standards, and/or communication devices operating in different operation modes, such as MTC mode/UE mode).

In this example, the base station 5 (using its PRACH configuration module 67) allocates a first set of preamble sequences to legacy communication devices, allocates a second set of preamble sequences (different to the first set) to (MTC) communication devices operating in reduced bandwidth (BW) mode, and allocates a third set of preamble sequences (different to the first set and the second set) to (MTC) communication devices operating in coverage enhanced (CE) mode. One or more of the sets of preamble sequences may also be split into further sub-sets, when appropriate. An exemplary preamble sequence partitioning is illustrated in Table 2 below, in which the first set includes PRACH preambles 0-31, the second set includes PRACH preambles 32-42, and the third set includes PRACH preambles 43-63 (further divided into four sub-sets for different levels of coverage enhancement).

The base station 5 is beneficially configured to broadcast (using its broadcast module 65) in its cell information relating to the applicable preamble sequence partitioning via higher layer signalling (e.g. SIB2), for example, by using an appropriate PRACH configuration index. This way the base station 5 is able to inform communication devices 3 within its cell which preamble sequence applies to each category of devices so that the communication devices 3 are able to select and transmit a preamble sequence that (implicitly) indicates to the base station 5 the category of that communication device 3.

For example, if the MTC device 3-2 is a reduced bandwidth UE, then it selects (using its MTC module 45) a preamble from preambles no. 32 to 42 and transmits (using its transceiver circuit 43) this preamble to the base station 5 over the PRACH (in any subframe in which PRACH is configured). Based on the received preamble, the base station 5 is able to determine (using its UE category determination module 69) that the sending communication device 3-2 is a reduced bandwidth MTC device, and allocates resources accordingly (sets a DCI for the MTC device 3-2 such that the allocated resources fall within the bandwidth that the MTC device 3-2 is capable to use).

Advantageously, based on the received preamble sequence and the set to which that preamble sequence belongs, the base station 5 is able to determine whether to transmit a DCI in the PDCCH CSS (i.e. in response to a preamble sequence sent by a legacy MTC device) or to transmit a DCI in the EPDCCH CSS (i.e. in response to a preamble sequence sent by a reduced bandwidth MTC device or a coverage enhanced MTC device). In other words, the base station 5 is configured to send Random Access Response (RAR) messages (which include an appropriate DCI) via the EPDCCH Common Search Space (EPDCCH CSS) for reduced bandwidth MTC devices and for enhanced coverage MTC devices.

It will be appreciated that option A can be realised regardless of whether or not the multiplexing scheme illustrated in Table 2 is used. However, if preamble sequence partitioning is used, then the number of available preamble sequences for each partition may be small which in turn may increase collision probability between the same category of MTC devices.

<Operation—Option B>

Figure 4:
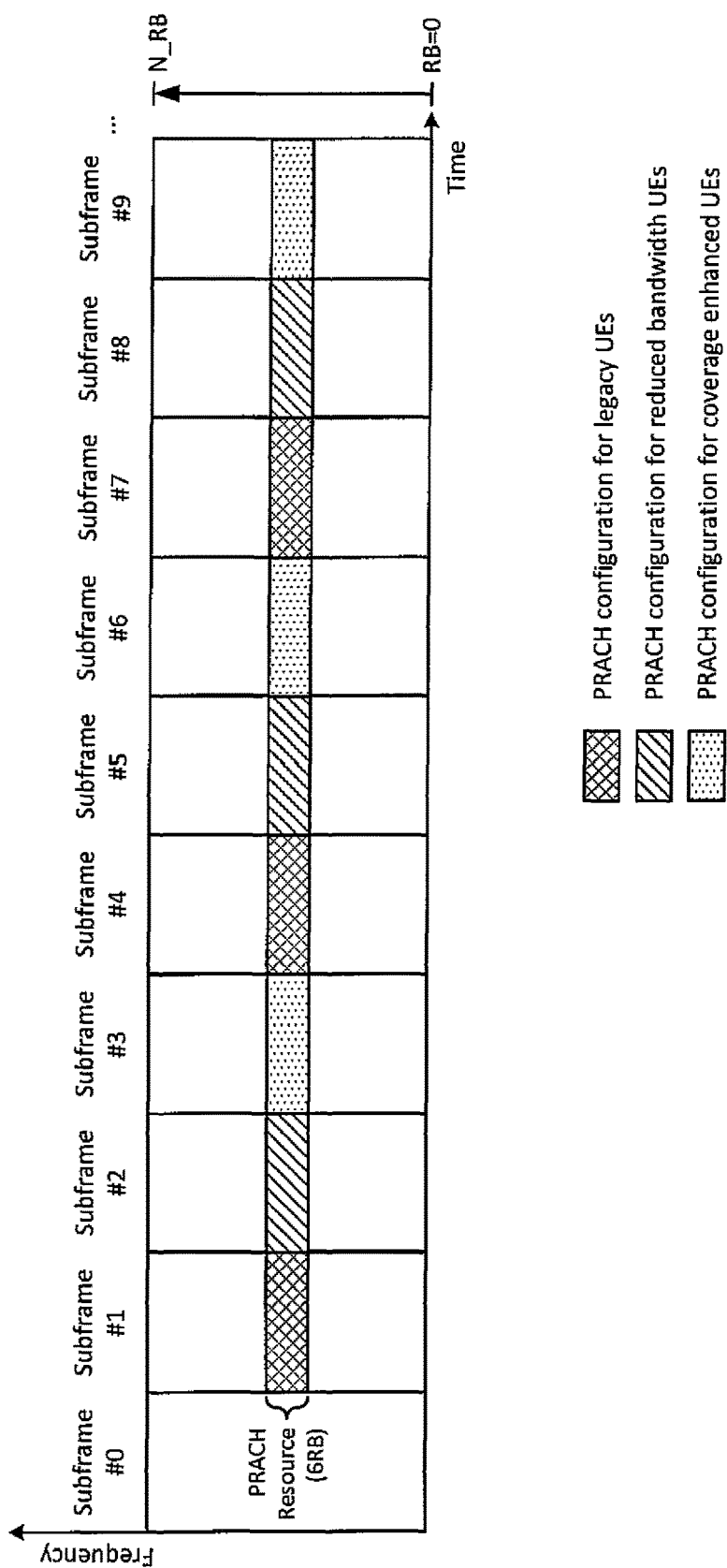
FIG. 4 illustrates an exemplary way in which UE category specific PRACH configurations can be employed in the system shown in FIG. 1.

FIG. 4 illustrates an exemplary way in which UE category specific PRACH configurations can be employed in the system shown in FIG. 1. In this example, the base station 5 employs, for each category of communication devices 3, a respective associated PRACH configuration using different time resources (e.g. in a different subframe for each device category).

The various PRACH configuration indices (and the associated preamble formats and subframes) that may currently be used in LTE systems are disclosed in Table 5.7.1-2 of 3GPP TS 36.211. Some of the PRACH indices that may be used in this example are also shown in Table 3 below.

TABLE 2 preamble sequence partitioning

| Legacy UEs | MTC UEs in reduced BW | MTC CE UEs Level 1 (e.g. 5 dB) | MTC CE UEs Level 2 (e.g. 10 dB) | MTC CE UEs Level 3 (e.g. 15 dB) | MTC CE UEs Level 4 (e.g. 20 dB) |
|---|---|---|---|---|---|
| PRACH preambles sequences 0-31 | PRACH preambles sequences 32-42 | PRACH preambles sequences 43-50 | PRACH preambles sequences 51-56 | PRACH preambles sequences 57-60 | PRACH preambles sequences 61-63 |

However, rather than supporting a single PRACH configuration in its cell (as currently defined for LTE in 3GPP TS 36.211), the base station 5 in this example is configured to apply sequence partitioning for its PRACH configurations, i.e. the base station 5 employs multiple PRACH configurations in the time domain.

Specifically, in this example the base station 5 is configured to transmit (using its broadcast module 65): i) PRACH configuration index no. 9 to be applied in subframes #1, #4, and #7 (e.g. for legacy UEs); ii) PRACH configuration index no. 10 to be applied in subframes #2, #5, and #8 (e.g. for reduced bandwidth UEs); and iii) PRACH configuration index no. 11 to be applied in subframes #3, #6, and #9 (e.g. for coverage enhanced UEs). This information may be broadcast, for example, as part of the SIB2 information.

TABLE 3

PRACH configurations (source: Table 5.7.1-2 of 3GPP TS 36.211)

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| ... | ... | ... | ... |

For example, the base station 5 may broadcast (e.g. in advance) the applicable PRACH configuration index for each UE category. However, it will also be appreciated that the base station 5 may broadcast, in each subframe, the currently applicable PRACH configuration index, and information identifying the associated UE category (e.g. instead or in addition to any advance indication).

By listening to the base station's 5 broadcast information (e.g. SIB2), each communication device 3 is able to obtain (using its MTC module 45) the applicable PRACH configuration index for its category. Therefore, whenever a communication device (e.g. the MTC device 3-2) needs to perform a random access procedure, it transmits (using its random access module 47 and transceiver circuit 31) a preamble sequence within the subframe allocated to its category of UEs (as specified by the PRACH configuration index for that category).

Beneficially, based on the time resource (subframe) in which the base station 5 receives the random access message (preamble sequence), the base station 5 is able to determine (using its UE category determination module 69) the category of the sending communication device. Therefore, the base station 5 can also determine whether to transmit a DCI in the PDCCH CSS (for legacy UEs) or to transmit a DCI in the EPDCCH CSS (for reduced bandwidth UEs and/or coverage enhanced UEs) in response to the communication device's random access message.

In addition, for coverage enhanced UEs, the base station 5 (using its PRACH configuration module 67) may also perform preamble sequence partitioning (as per option A above) within the associated PRACH configuration index in time and inform (e.g. via system broadcast) the communication devices 3 which sequence partition applies to which coverage level within the associated PRACH time resources (subframes).

<Operation—Option C>

Figure 5:
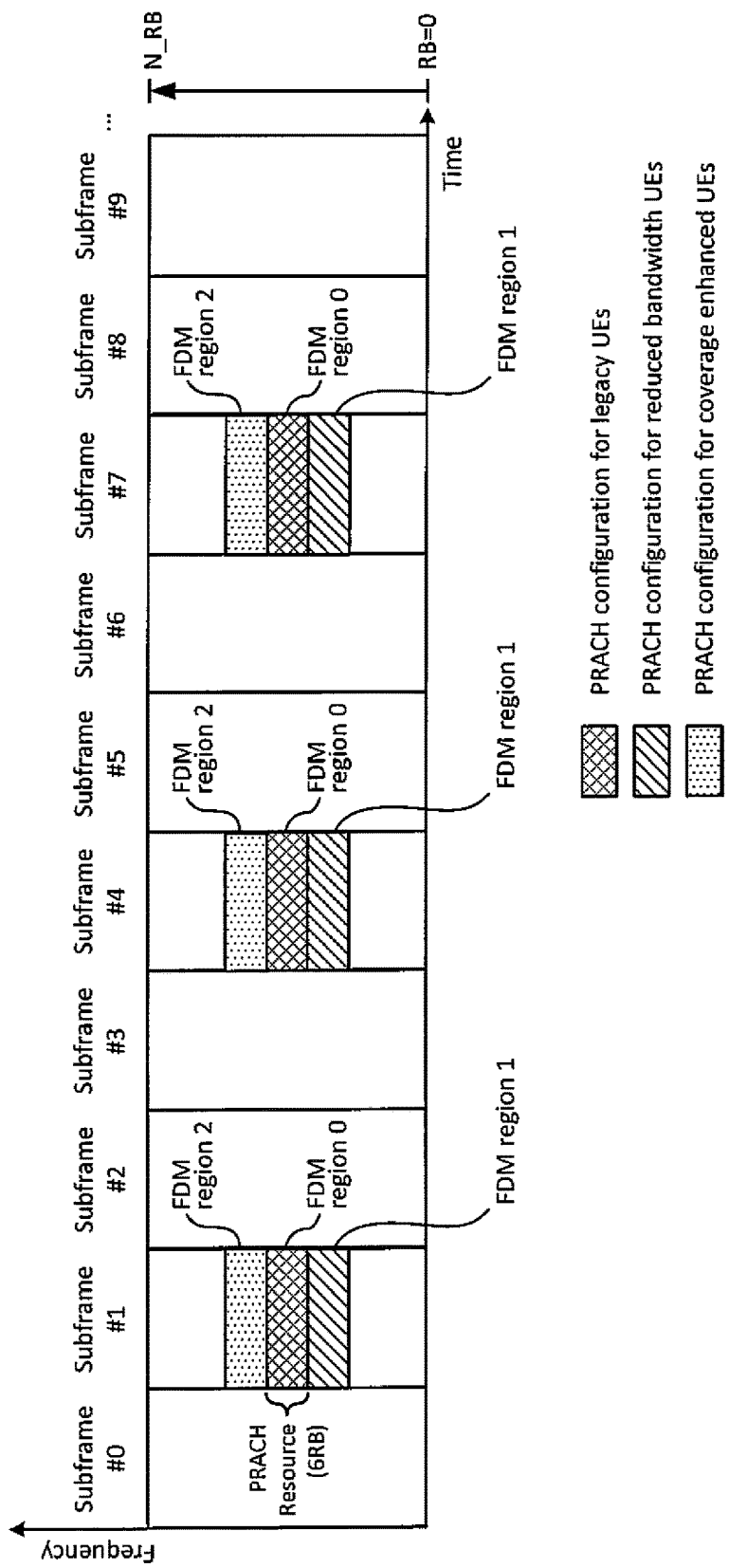
FIG. 5 illustrates an exemplary way in which UE category specific PRACH configurations can be employed in the system shown in FIG. 1.

FIG. 5 illustrates another exemplary way in which UE category specific PRACH configurations can be employed in the system shown in FIG. 1. In this example, the base station 5 employs, for each category of communication devices 3, a respective associated PRACH configuration using different associated frequency resources (e.g. PRACH is provided in a different frequency band for each device category) of the same subframe. Effectively, the resulting PRACH configuration comprises a frequency division multiplexing (FDM) based PRACH, in which each category of communication device 3 is configured to use a different frequency band during the random access procedure.

In this example, the following PRACH configuration is employed:

FDM region '0' is allocated to legacy UEs;
FDM region '1' is allocated to reduced bandwidth (MTC) UEs; and
FDM region '2' is allocated to coverage enhanced (MTC) UEs.

It will be appreciated that in FDM region '2' it is also possible to employ additional sequence partitioning (as per option A) for distinguishing among different levels of coverage enhancement supported by the mobile communication device transmitting in that FDM region.

For example, the base station 5 may broadcast (e.g. in advance and/or in each subframe) information identifying the respective PRACH configuration (including information identifying the associated frequency band) for each UE category.

By listening to the information (e.g. SIB2) broadcast by the base station 5, each communication device 3 is able to obtain (using its MTC module 45) the applicable PRACH configuration (PRACH frequency band) for its category. Therefore, whenever a communication device (e.g. the MTC device 3-2) needs to perform a random access procedure, its random access module 47 transmits a preamble sequence within the frequency band configured for its category (e.g. in any of subframes #1, #4, and #7 shown in FIG. 5).

Then, depending on the frequency (and time) resource in which the base station 5 receives the preamble sequence transmission, the base station 5 is able to determine (using its UE category determination module 69) the category of the sending communication device. Therefore, the base station 5 can also determine whether to transmit a DCI in the PDCCH CSS (for legacy UEs) or to transmit a DCI in the EPDCCH CSS (for reduced bandwidth UEs and/or coverage enhanced UEs) in response to the communication device's random access message.

In addition, for coverage enhanced UEs, the base station 5 may also perform preamble sequence partitioning (as per option A above) within the associated PRACH frequency resource (FDM region) and inform (e.g. via system broadcast) the communication devices 3 which sequence partition applies to which coverage level within the associated PRACH frequency resource.

<Operation—Option D>

Figure 6:
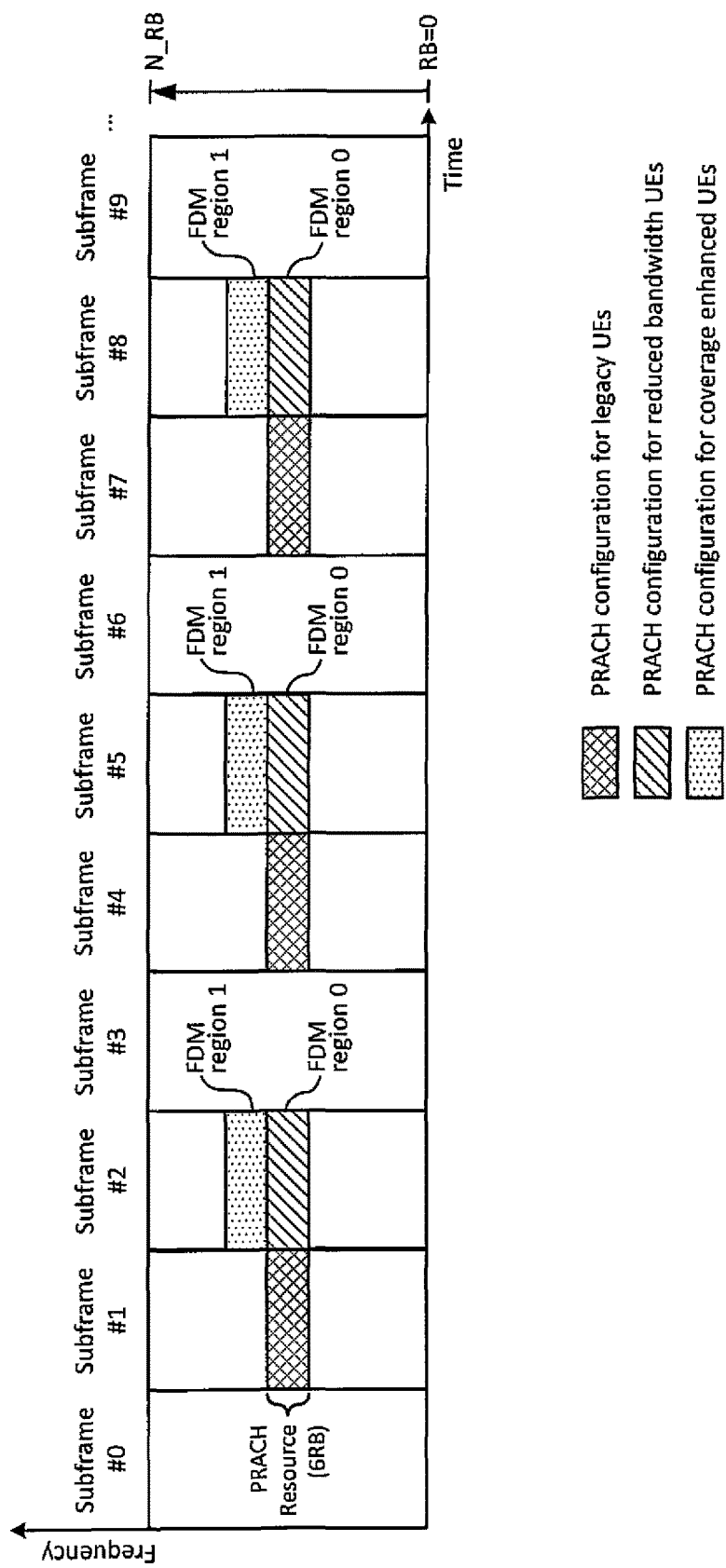
FIG. 6 illustrates an exemplary way in which UE category specific PRACH configurations can be employed in the system shown in FIG. 1.

FIG. 6 illustrates yet another exemplary way in which UE category specific PRACH configurations can be employed in the system shown in FIG. 1. In this example, the base station 5 employs a hybrid time-frequency resource based PRACH configuration for differentiating among the different categories of communication devices 3.

Effectively, option D is a combination of options B and C (and may further be combined with option A, when appropriate).

In the example shown in FIG. 6, three categories of communication devices are supported in the cell of the base station 5. The first category of communication devices includes legacy UEs, the second category includes reduced bandwidth UEs, and the third category includes coverage enhanced UEs.

The first category is allocated PRACH resources based on an appropriate PRACH configuration index (in subframes #1, #4, and #7 as specified by e.g. PRACH index 9 shown in Table 3), whilst the second and third category of communication devices are allocated FDM based PRACH resources (in subframes #2, #5, and #8), in which each of the two category of communication devices is configured to use a different frequency band during the random access procedure.

In this example, the following frequency division multiplexing is employed:
FDM region '0' is allocated to coverage enhanced MTC UEs; and
FDM region '1' is allocated to reduced bandwidth MTC UEs.

It will be appreciated that in FDM region '0' it is also possible to employ additional sequence partitioning (as per option A) for distinguishing among different levels of coverage enhancement supported by the mobile communication device transmitting in that FDM region.

In this example, the base station 5 broadcasts (e.g. in advance and/or in each subframe) information identifying the respective PRACH configuration (including information identifying the associated frequency band and subframe) for each UE category.

By listening to the information (e.g. SIB2) broadcast by the base station 5, each communication device 3 is able to obtain (using its MTC module 45) the applicable PRACH configuration (PRACH frequency band/PRACH configuration index) for its category. Therefore, whenever a communication device (e.g. the MTC device 3-2) needs to perform a random access procedure, its random access module 47 transmits a preamble sequence within the subframe/frequency band configured for its category.

Then, depending on the frequency band and subframe in which the base station 5 receives the preamble sequence transmission, the base station 5 is able to determine (using its UE category determination module 69) the category of the sending communication device. Therefore, the base station 5 can also determine whether to transmit a DCI in the PDCCH CSS (for legacy UEs) or to transmit a DCI in the EPDCCH CSS (for reduced bandwidth UEs and/or coverage enhanced UEs) in response to the communication device's random access message.

21 Modifications and Alternatives>

Detailed embodiments have been described above. As those skilled in the art will appreciate, a number of modifications and alternatives can be made to the above embodiments whilst still benefiting from the inventions embodied therein.

In the above embodiments described with reference to FIGS. 4 to 6, a radio frame comprises ten subframes (subframes #0 to #9). As those skilled in the art will appreciate a radio frame may include any number of subframes.

In the above description, information relating to the PRACH configuration is signalled via the SIB2. However, it will be appreciated that the PRACH configuration (at least part of it) may be signalled via a different system information block, for example, via one or more SIB specific to reduced bandwidth UEs and/or coverage enhanced UEs. Alternatively or additionally, some or all of this information can be obtained by the communication devices in a different manner—for example the PRACH configuration may be signalled via system broadcast (e.g. PBCH) and/or via higher layers (e.g. RRC).

Furthermore, the applicable PRACH configuration may not be explicitly signalled by the base station and may instead be determined based upon other information, such as a cell ID associated with the base station. This has the benefit of reducing the amount of data that has to be signalled to the communication devices.

It will be appreciated that although the communication system is described in terms of the base station operating as a E-UTRAN base station (eNB), the same principles may be applied to base stations operating as macro or pico base stations, femto base stations, relay nodes providing elements of base station functionality, home base stations (HeNB), or other such communication nodes.

In the above embodiments, an LTE telecommunications system was described. As those skilled in the art will appreciate, the techniques described in the present application can be employed in other communications systems, including earlier 3GPP type systems. Other communications nodes or devices may include user devices such as, for example, personal digital assistants, laptop computers, web browsers, etc.

In the embodiments described above, the base station and the communication device each include transceiver circuitry. Typically, this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base station or the user device as a signal over a computer network, or on a recording medium. Further, the functionality performed by part or all of this software may be performed using one or more dedicated hardware circuits.

In the above embodiments, machine-type communication devices and mobile telephones are described. However, it will be appreciated that mobile telephones (and similar user equipment) may also be configured to operate as machine-type communication devices. For example, the mobile telephone 3-1 may include (and/or provide the functionality of) the MTC module 45.

Examples of MTC applications

It will be appreciated that each communication device may support one or more MTC applications. Some examples of MTC applications are listed in the following table (source: 3GPP TS 22.368, Annex B). This list is not exhaustive and is intended to be indicative of the scope of machine-type communication applications.

TABLE 4

| Service Area | MTC applications |
| --- | --- |
| Security | Surveillance systems |
| | Backup for landline |

TABLE 4-continued

| Service Area | MTC applications |
|---|---|
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Various other modifications will be apparent to those skilled in the art and will not be described in further detail here.

Some or all of the aforementioned embodiments may be described in the following supplementary notes. Nevertheless, the present invention is not limited to the following supplementary notes in any way.

(Supplementary Note 1)

A communications node operable to allocate resources for potential use by any of a plurality of user communication devices, including legacy user communication devices and machine-type communication, (MTC), devices, for communicating with the communications node, the communications node comprising:

means for sending, to said plurality of user communication devices, control data defining communication resources for potential use by any of said plurality of user communication devices, the control data including information identifying at least;
  i) a first physical random access channel, PRACH, resource configuration for said legacy user communication devices; and
  ii) a second PRACH resource configuration for said MTC devices;

means for receiving, from a user communication device of said plurality of user communication devices, a random access message conforming to one of said first and second PRACH resource configurations over communication resources defined by said control data; and means for determining, based on the PRACH resource configuration with which said received random access message conforms, whether said user communication device comprises a legacy user communication device or comprises an MTC device;

wherein said means for sending is operable to send a random access response (RAR) mapped to a physical downlink control channel (PDCCH) when said user communication device is determined to comprise a legacy user communication device and to send a random access response (RAR) mapped to an enhanced physical downlink control channel (EPDCCH) when said user communication device is determined to comprise an MTC device.

(Supplementary Note 2)

The communications node according Supplementary Note 1, wherein each said PRACH resource configuration defines an associated preamble sequence and wherein said random access message includes a prefix and a preamble sequence conforming to one of said first and second PRACH resource configurations, and wherein said determining means is operable to determine whether said first user communication device comprises a legacy user communication device or comprises an MTC device based on said preamble sequence included in said random access message.

(Supplementary Note 3)

The communications node according to Supplementary Note 1 or 2, wherein:
  i) said first PRACH resource configuration defines a first set of communication resources for potential use by said legacy user communication devices; and
  ii) said second PRACH resource configuration defines a second set of communication resources, different to said first set, for potential use by said MTC devices; and
  wherein said determining means is operable to determine that:
  i) said first user communication device comprises a legacy user communication device when said receiving means receives said random access message over a communication resource that belongs to said first set of communication resources; and
  ii) said first user communication device comprises an MTC device when said receiving means receives said random access message over a communication resource that belongs to said second set of communication resources.

(Supplementary Note 4)

The communications node according to any of Supplementary Notes 1 to 3, wherein said determining means is operable to determine, when said user communication device is an MTC device, whether that MTC device comprises a reduced bandwidth MTC device and/or a coverage enhanced MTC device.

(Supplementary Note 5)

The communications node according to Supplementary Note 4, wherein said determining means is operable to determine, when said user communication device is a coverage enhanced MTC device, a level of coverage enhancement required by said coverage enhanced MTC device.

(Supplementary Note 6)

The communications node according to any of Supplementary Notes 1 to 5, wherein at least one of said first and said second PRACH resource configurations defines a set of communication resources comprising no more than six physical resource blocks.

(Supplementary Note 7)

The communications node according to any of Supplementary Notes 1 to 6, comprising a base station.

(Supplementary Note 8)

The communications node according to Supplementary Note 6 comprising a base station operating in accordance with the long term evolution, LTE, set of standards.

(Supplementary Note 9)

The communications node according to any of Supplementary Notes 1 to 8 wherein said communication resources are resources provided in accordance with at least one of a time, a frequency, and a code sequence multiplexing scheme.

(Supplementary Note 10)

A machine-type communication, (MTC), device for a communication system in which a communications node allocates resources for potential use by any of a plurality of user communication devices, including legacy user communication devices and machine-type communication, (MTC), devices, the MTC communications device comprising:

means for receiving, from the communications node, control data defining communication resources for potential use by any of said plurality of user communication devices, the control data including information identifying at least;
  i) a first physical random access channel, PRACH, resource configuration for said legacy user communication devices; and
  ii) a second PRACH resource configuration for said MTC devices; and means for sending, to the communications node, a random access message conforming to said second PRACH resource configuration over communication resources defined by said control data;

wherein said means for receiving is operable to receive a random access response (RAR) mapped to an enhanced physical downlink control channel (EPDCCH) responsive to said random access message.

(Supplementary Note 11)

A method performed by a communications node in a communication system in which the communications allocates resources for potential use by any of a plurality of user communication devices, including legacy user communication devices and machine-type communication, (MTC), devices, for communicating with the communications node, the method comprising:

sending, to said plurality of user communication devices, control data defining communication resources for potential use by any of said plurality of user communication devices, the control data including information identifying at least;
  i) a first physical random access channel, PRACH, resource configuration for said legacy user communication devices; and
  ii) a second PRACH resource configuration for said MTC devices;

receiving, from a user communication device of said plurality of user communication devices, a random access message conforming to one of said first and second PRACH resource configurations over communication resources defined by said control data;

determining, based on the PRACH resource configuration with which said received random access message conforms, whether said user communication device comprises a legacy user communication device or comprises an MTC device;

sending a random access response (RAR) mapped to a physical downlink control channel (PDCCH) when said user communication device is determined to comprise a legacy user communication device; and sending a random access response (RAR) mapped to an enhanced physical downlink control channel (EPDCCH) when said user communication device is determined to comprise an MTC device.

(Supplementary Note 12)

A method performed by a machine-type communication, (MTC), device in a communication system in which a communications node allocates resources for potential use by any of a plurality of user communication devices, including legacy user communication devices and machine-type communication, (MTC), devices, the method comprising:

receiving, from the communications node, control data defining communication resources for potential use by any of said plurality of user communication devices, the control data including information identifying at least;
  i) a first physical random access channel, PRACH, resource configuration for said legacy user communication devices; and
  ii) a second PRACH resource configuration for said MTC devices;

sending, to the communications node, a random access message conforming to said second PRACH resource configuration over communication resources defined by said control data; and receiving a random access response (RAR) mapped to an enhanced physical downlink control channel (EPDCCH) responsive to said random access message.

(Supplementary Note 13)

A communication system comprising a communications node according to any of Supplementary Notes 1 to 8 and an machine-type communication device according to Supplementary Note 9.

(Supplementary Note 14)

A computer program product comprising computer implementable instructions for causing a processing device to perform a method according to Supplementary Note 10 or 11.

The invention claimed is:

1. A communication apparatus which is operable to communicate with at least one of a first type user equipment (UE) and a second, coverage enhanced, type UE, wherein the coverage enhanced type UE is a UE for which transmissions are repeated in time domain in accordance with one of a plurality of coverage enhancement levels, wherein each coverage enhancement level employs a respective number of repetitions, the communication apparatus comprising:

a transceiver circuit configured to transmit a control signal, wherein the control signal comprises a first resource configuration for a first physical random access channel (PRACH) for the first type UE and a second resource configuration for a second PRACH for the second type UE, wherein said second resource configuration comprises a respective PRACH configuration for each of the plurality of levels of coverage enhancement, wherein the transceiver circuit is further configured to transmit the second resource configuration for the second PRACH via higher layers; and wherein the transceiver circuit is further configured to receive a random access message based on either one of the first resource configuration and the second resource configuration.

2. The communication apparatus according to claim 1, wherein the transceiver circuit is further configured to transmit a random access response (RAR), wherein the RAR is mapped to a physical downlink control channel (PDCCH) in case the RAR is transmitted to the first type UE, wherein the RAR is mapped to a machine-type communications (MTC) specific physical downlink control channel (PDCCH) in case the RAR is transmitted to the second type UE; and wherein when the transceiver circuit receives a random access message based on a particular PRACH configuration, the transceiver circuit is further configured to transmit the RAR using the level of coverage enhancement corresponding to that PRACH configuration.

3. The communication apparatus according to claim 1, wherein the random access message is based on the first resource configuration in case that the first type UE transmits the random access message, and
wherein the random access message is based on the second resource configuration in case that the second type UE transmits the random access message.

4. The communication apparatus according to claim 1, wherein the communication apparatus further comprises a controller configured to determine a type of a UE based on a resource to receive the random access message.

5. User equipment (UE) which is operable to communicate with a communication apparatus employing coverage enhanced signaling by repeating transmissions in time domain in accordance with one of a plurality of coverage enhancement levels, wherein each coverage enhancement level employs a respective number of repetitions, the UE comprising:
a transceiver circuit configured to receive a control signal comprising a resource configuration for a PRACH, wherein said resource configuration comprises a respective PRACH configuration for each of the plurality of levels of coverage enhancement;
wherein the transceiver circuit is further configured to receive the resource configuration for the PRACH via higher layers; and
wherein transceiver circuit is further configured to transmit a random access message based on the resource configuration.

6. The UE according to claim 5, wherein the resource configuration is determined based on a category of the UE.

7. The UE according to claim 5, wherein the UE is a machine-type communication (MTC) device.

8. The UE according to claim 7, comprising at least one of:
a reduced bandwidth MTC device; and a coverage enhanced MTC device.

9. The UE according to claim 5, wherein the resource configuration is mapped to a coverage level.

10. The UE according to claim 9, wherein the coverage level is mapped to a number of repetitions of a control channel transmission.

11. The UE according to claim 5, wherein the transceiver circuit is configured to receive a random access response (RAR), the RAR being mapped to a machine-type communications (MTC) specific physical downlink control channel (PDCCH).

12. The UE according to claim 11, wherein the transceiver circuit is further configured to transmit the random access message based on a particular PRACH configuration, and the transceiver circuit is further configured to receive the RAR using the level of coverage enhancement corresponding to that PRACH configuration.

13. A method performed by a communication apparatus which is operable to communicate with at least one of a first type user equipment (UE) and a second, coverage enhanced, type UE, wherein the coverage enhanced type UE is a UE for which transmissions are repeated in time domain in accordance with one of a plurality of coverage enhancement levels, wherein each coverage enhancement level employs a respective number of repetitions, the method comprising:
transmitting a control signal, wherein the control signal comprises first resource configuration for a first physical random access channel (PRACH) for the first type UE and second resource configuration for a second PRACH for the second type UE, wherein said second resource configuration comprises a respective PRACH configuration for each of the plurality of levels of coverage enhancement, wherein the second resource configuration for the second PRACH is transmitted via higher layers; and
receiving a random access message based on either one of the first resource configuration and the second resource configuration.

14. A method performed by user equipment (UE) which is operable to communicate with a communication apparatus employing coverage enhanced signalling by repeating transmissions in time domain in accordance with one of a plurality of coverage enhancement levels, wherein each coverage enhancement level employs a respective number of repetitions, the method comprising:
receiving a control signal comprising a resource configuration for a PRACH, wherein said resource configuration comprises a respective PRACH configuration for each of the plurality of levels of coverage enhancement, wherein the resource configuration for the PRACH is received via higher layers; and
transmitting a random access message based on the resource configuration.

* * * * *